US009783035B1

(12) United States Patent
Huang et al.

(10) Patent No.: US 9,783,035 B1
(45) Date of Patent: Oct. 10, 2017

(54) COMPACT ELECTRICALLY POWERED AXLE ASSEMBLY

(71) Applicant: American Axle & Manufacturing, Inc., Detroit, MI (US)

(72) Inventors: Zugang Huang, Troy, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 15/223,784

(22) Filed: Jul. 29, 2016

(51) Int. Cl.
| | |
|---|---|
| *B60K 1/00* | (2006.01) |
| *B60L 11/18* | (2006.01) |
| *F16H 48/34* | (2012.01) |
| *B60K 17/14* | (2006.01) |
| *B60K 17/16* | (2006.01) |
| *F16H 37/00* | (2006.01) |
| *B60K 6/48* | (2007.10) |
| *B60K 6/405* | (2007.10) |
| *B60K 6/547* | (2007.10) |
| *B60K 6/365* | (2007.10) |
| *B60K 17/356* | (2006.01) |

(52) U.S. Cl.
CPC ............ *B60K 1/00* (2013.01); *B60K 17/145* (2013.01); *B60K 17/16* (2013.01); *B60L 11/18* (2013.01); *F16H 37/00* (2013.01); *F16H 48/34* (2013.01); *B60K 6/365* (2013.01); *B60K 6/405* (2013.01); *B60K 6/48* (2013.01); *B60K 6/547* (2013.01); *B60K 17/356* (2013.01); *F16H 2048/346* (2013.01); *Y10S 903/903* (2013.01); *Y10S 903/911* (2013.01)

(58) Field of Classification Search
CPC ........ B60K 1/00; B60K 17/145; B60K 17/16; B60K 6/405; B60K 17/356; F16H 48/34; F16H 2048/346
See application file for complete search history.

(56) References Cited

U.S. PATENT DOCUMENTS

| | | |
|---|---|---|
| 6,540,636 B2 | 4/2003 | Amanuma et al. |
| 6,864,607 B2 | 3/2005 | Hashimoto |
| 7,030,526 B2 | 4/2006 | Tsukamoto et al. |
| 7,383,902 B2 | 6/2008 | Matsuzaki et al. |
| 8,454,473 B2 | 6/2013 | Reitz |
| 8,479,851 B2 | 7/2013 | Mack et al. |
| 8,668,037 B2 | 3/2014 | Shinde et al. |
| 8,960,341 B2 | 2/2015 | Weber |

(Continued)

*Primary Examiner* — Brian Swenson
(74) *Attorney, Agent, or Firm* — Harness, Dickey & Pierce, P.L.C.

(57) ABSTRACT

A vehicle axle assembly including an electric motor, an electric power source, a mode shift gearset, an actuator and a differential within a housing. The motor can include a first output member. The mode shift gearset can include a second output member and a shift member. The shift member can transmit torque between the first and second output members when the shift member is in a second position. The actuator can be coupled to the shift member to move the shift member between first and second positions. The differential can include a differential case and a differential gearset. The differential case can be drivingly coupled to the second output member to receive rotary power therefrom. The differential gearset can transmit rotary power between the differential case and first and second output shafts.

20 Claims, 8 Drawing Sheets

(56) References Cited

U.S. PATENT DOCUMENTS

| | | | | |
|---|---|---|---|---|
| 8,986,148 B2* | 3/2015 | Downs | ................... | B60K 17/35 |
| | | | | 475/204 |
| 9,234,565 B2 | 1/2016 | Zhang et al. | | |
| 2004/0108778 A1* | 6/2004 | Tsukamoto | ............ | H02K 7/116 |
| | | | | 310/83 |
| 2005/0006164 A1 | 1/2005 | Teraoka | | |
| 2013/0240273 A1* | 9/2013 | Langer | ..................... | B60K 1/00 |
| | | | | 180/55 |
| 2015/0053027 A1* | 2/2015 | Downs | ................. | F16H 63/304 |
| | | | | 74/15.4 |
| 2015/0152947 A1* | 6/2015 | Smetana | ................. | F16H 48/36 |
| | | | | 475/5 |

* cited by examiner

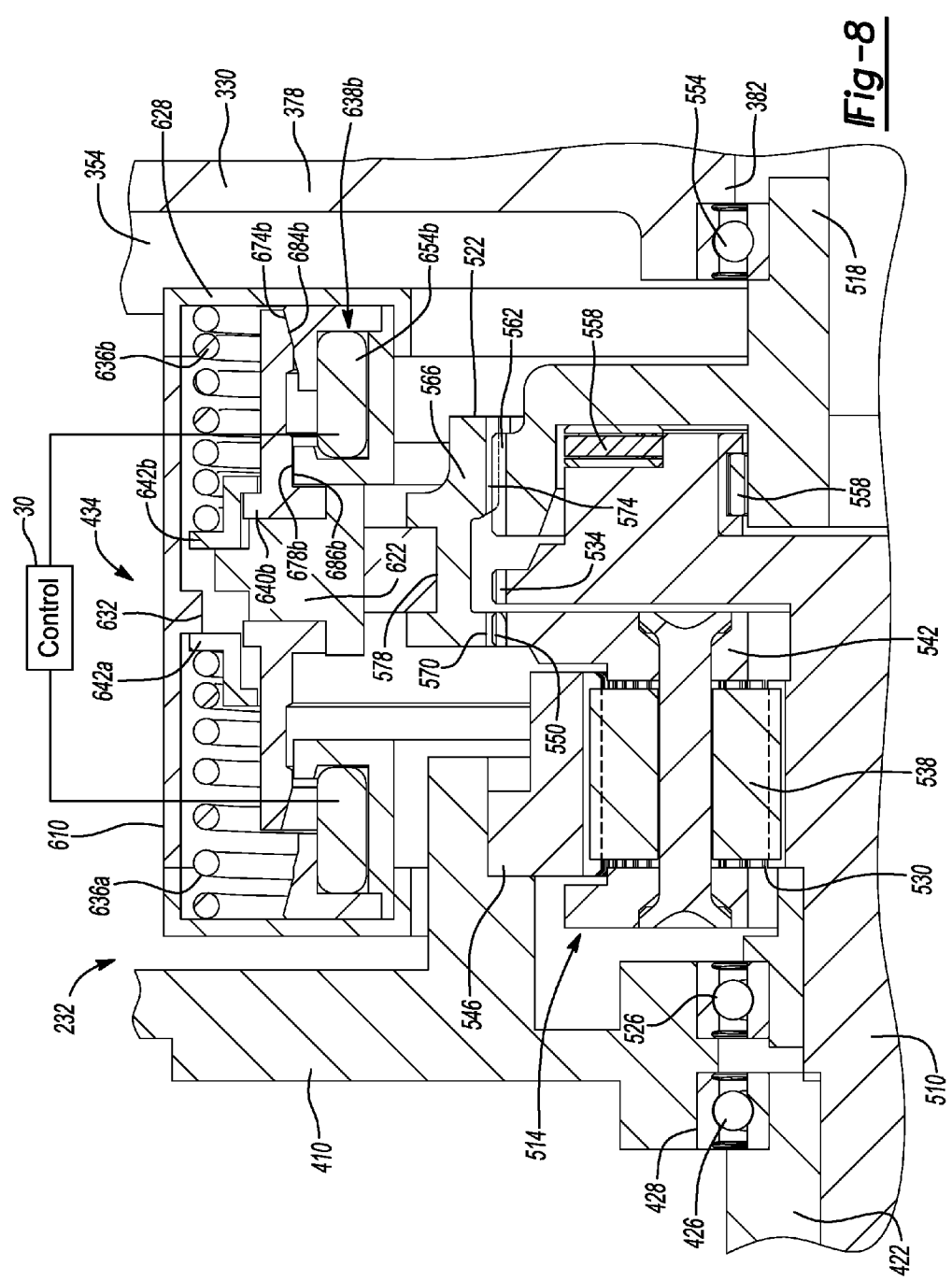

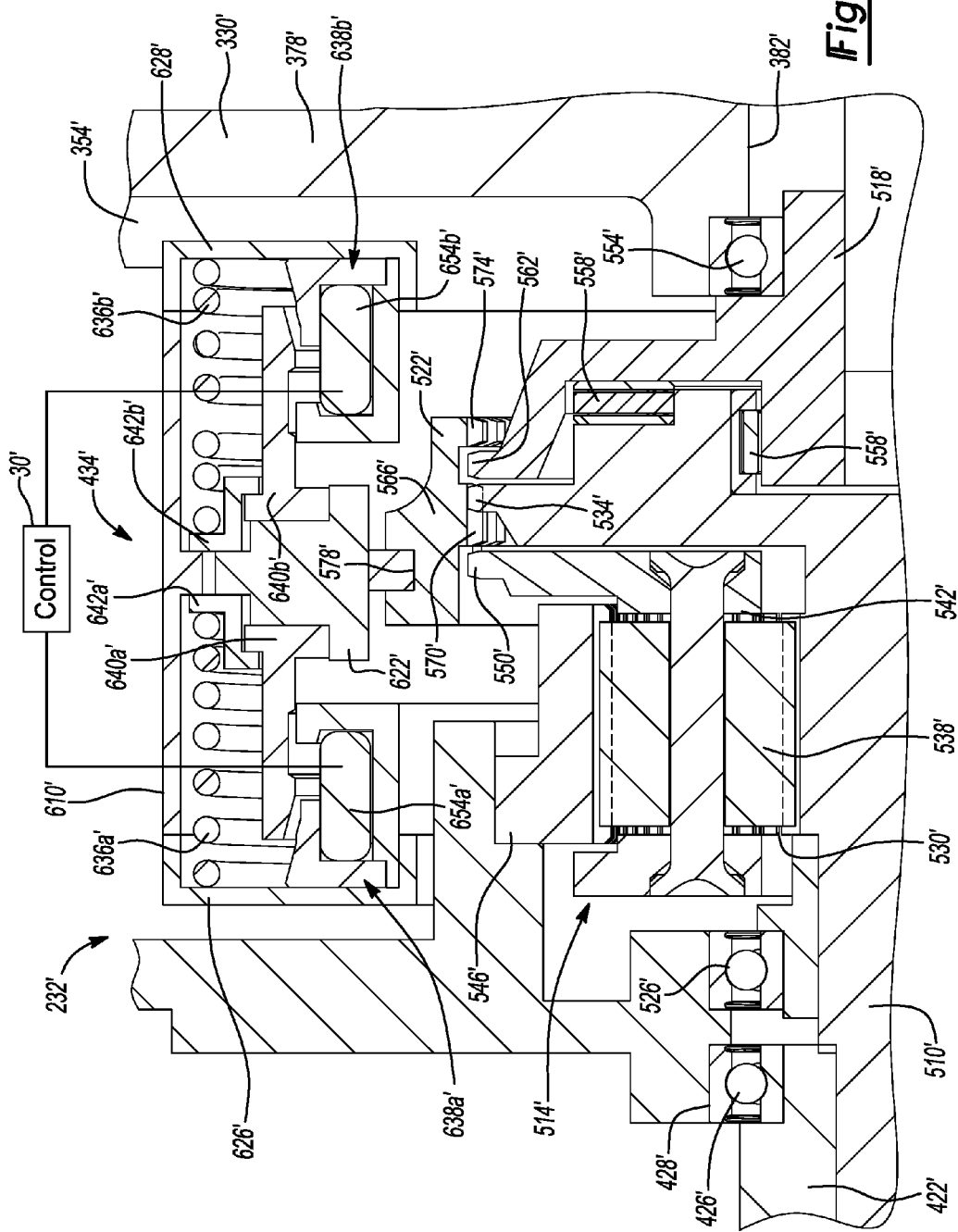

COMPACT ELECTRICALLY POWERED AXLE ASSEMBLY

FIELD

The present disclosure relates to a compact electrically powered axle assembly.

BACKGROUND

This section provides background information related to the present disclosure which is not necessarily prior art.

Electronic drive modules ("eDMs", e.g. electronic rear drive modules "eRDMs") can be employed as a primary drive means for propelling a vehicle by providing torque to a set of primary drive wheels. Additionally or alternatively, EDMs can be employed as a secondary drive means (e.g., for providing all-wheel drive capabilities when the primary drive wheels are driven by a primary drive means) by providing torque to a set of secondary drive wheels. EDMs typically include an electric motor that transmits rotary power to a transmission and a differential assembly to drive a pair of vehicle wheels. The power source (e.g., a battery) for the electric motor is typically located away from the EDM at a remote location within the vehicle.

SUMMARY

This section provides a general summary of the disclosure, and is not a comprehensive disclosure of its full scope or all of its features.

The present teachings provide for an axle assembly for a vehicle including a first output shaft, a second output shaft, a housing, an electric motor, an electric power source, a mode shift gearset, an actuator and a differential. The electric motor can be disposed within the housing and can include a first output member. The electric power source can be disposed within the housing and can be electrically coupled to the electric motor to provide electrical power thereto. The mode shift gearset can be disposed within the housing and can include a second output member and a shift member. The shift member can be movable between a first position and a second position relative to the first and second output members. The shift member can transmit torque between the first and second output members when the shift member is in the second position. The actuator can be disposed within the housing and can be coupled to the shift member. The actuator can be configured to move the shift member between the first and second positions. The differential can be disposed within the housing and can include a differential case and a differential gearset. The differential case can be drivingly coupled to the second output member to receive rotary power therefrom. The differential gearset can be configured to transmit rotary power between the differential case and the first and second output shafts.

The present teachings further provide for an axle assembly for a vehicle including a first output shaft, a second output shaft, a mode shift unit, a linear motor and a differential. The first output shaft can be rotatable about a first axis. The second output shaft can be rotatable about the first axis. The mode shift unit can include a first input member, a second input member, a gearset, an output member and a shift member. The first input member can be rotatable about the second axis and can include a first set of teeth and a second set of teeth. The second input member can be rotatable about the second axis and can include a third set of teeth. The gearset can couple the first input member to the second input member such that rotation of the first input member drives rotation of the second input member at a rotational speed that is different from a rotational speed of the first input member. The output member can be rotatable about the second axis and can include a fourth set of teeth. The shift member can be rotatable about the second axis and can be axially movable along the second axis between a first axial position and a second axial position. The shift member can be configured to matingly engage the second, third, and fourth sets of teeth when the shift member is in the first axial position. The shift member can be disengaged from at least two of the second, third, and fourth sets of teeth when the shift member is in the second axial position. The shift member can matingly engage the second and fourth sets of teeth to couple the first input member and the output member for common rotation when the shift member is in the third axial position. The shift member can matingly engage the third and fourth sets of teeth to couple the second input member and the output member for common rotation. The linear motor can be coupled to the shift member and can be configured to move the shift member between the first, second and third axial positions. The differential can include a differential case and a differential gearset. The differential case can be drivingly coupled to the output member to receive rotary power therefrom. The differential gearset can be configured to transmit rotary power between the differential case and the first and second output shafts.

The present teachings further provide for an axle assembly for a vehicle including a first output shaft, a second output shaft, an input member, an output member, a differential, a shift unit, and an actuator. The first output shaft can be rotatable about a first axis. The second output shaft can be rotatable about the first axis. The input member can be disposed about a second axis. The output member can be disposed about the second axis. The differential can include a differential case and a differential gearset. The differential case can be drivingly coupled to the output member to receive rotary power therefrom. The differential gearset can be configured to transmit rotary power between the differential case and the first and second output shafts. The shift unit can be operable in a first mode, a second mode, and a third mode. When the shift unit is in the first mode, rotary power is not transferred between the input member and the output member. When the shift unit is in the second mode, the input and output members are coupled to transmit rotary power between the input member and the output member at a first speed ratio. When the shift unit is in the third mode, the input and output members are coupled to transmit rotary power between the input member and the output member at a second speed ratio that is different from the first speed ratio. The actuator can be configured to switch the shift unit between the first, second and third modes. The actuator can include an armature assembly, a first electromagnet, a second electromagnet, a first spring and a second spring. The armature assembly can be disposed about the second axis and can be movable in a first axial direction from a first position to a second position, and in a second axial direction from the first position to a third position. The first electromagnet and the second electromagnet can be disposed about the second axis. The first electromagnet can be configured to move the armature assembly from the first position to the second position when the first electromagnet is activated. The second electromagnet can be configured to move the armature assembly from the first position to the third position when the second electromagnet is activated. The first spring and the second spring can be disposed about the second axis. When the armature assembly is between the first and second positions, the first spring biases the armature assembly in the second direction and the second spring does not bias the armature assembly in the first direction. When the armature assembly is between the first and third positions, the second spring biases the armature assembly in the first direction and the first spring does not bias the armature assembly in the second direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 is a sectional view similar to FIG. 5, illustrating the shift member in a third position; and FIG. 9 is a sectional view similar to FIG. 5, illustrating a shift unit of a second construction in a first position.

Corresponding reference numerals indicate corresponding parts throughout the several views of the drawings.

DETAILED DESCRIPTION

Example embodiments will now be described more fully with reference to the accompanying drawings.

Figure 1:
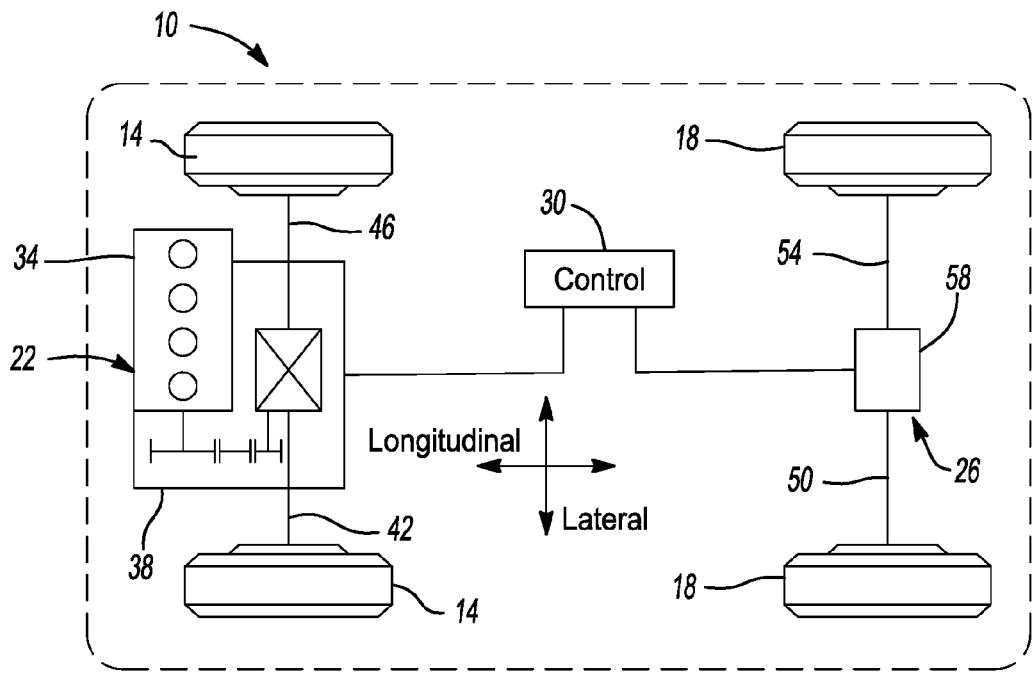
FIG. 1 is a schematic view of an example of a vehicle including an electric drive module ("EDM") constructed in accordance with the present teachings.

With reference to FIG. 1 of the drawings, an example of a vehicle 10 is schematically illustrated. The vehicle 10 can have a first set of drive wheels 14, a second set of drive wheels 18, a primary driveline 22, a secondary driveline 26, and a control module 30. The primary driveline 22 can be configured to provide torque output to drive the first set of drive wheels 14, while the secondary driveline 26 can be configured to provide torque output to drive the second set of drive wheels 18. The first set of drive wheels 14 can be front wheels of the vehicle 10, while the second set of drive wheels 18 can be rear wheels of the vehicle 10. Alternatively, the first set of drive wheels 14 can be rear wheels, while the second set of drive wheels 18 can be front wheels. In the example provided, the primary driveline 22 includes a rotary power generator 34, a transmission 38, and a first pair of axle shafts 42, 46, though other configurations can be used. In the example provided the rotary power generator 34 is an internal combustion engine, though an electric motor or other rotary power producing device can be used. The rotary power generator 34 can output rotary power to the transmission 38. In the example provided, the transmission 38 is a transaxle that can have a plurality of forward and/or reverse gears and a differential configured to output differential torque to the first pair of axle shafts 42, 46 to drive the first set of drive wheels 14.

The secondary driveline 26 can include a second pair of axle shafts 50, 54 and an electric drive module ("EDM") 58 configured to produce rotary power and output differential drive torque to the second pair of axle shafts 50, 54 to drive the second set of drive wheels 18. In the example provided, the second set of drive wheels 18 do not receive rotary power from the primary driveline 22 and the first set of drive wheels 14 do not receive rotary power from the secondary driveline 26.

Those of skill in the art will appreciate that the teachings of the present disclosure are applicable to EDMs in other drivetrain configurations, including four-wheel drive ("4WD") or all-wheel drive ("AWD") configurations wherein the primary driveline 22 and/or the secondary driveline 26 includes an EDM constructed in accordance with the present teachings. For example, the vehicle 10 can be configured with one EDM constructed in accordance with the present teachings driving the first set of drive wheels 14 and a second EDM constructed in accordance with the present teachings driving the second set of drive wheels 18. Those of skill in the art will also appreciate that the teachings of the present disclosure are applicable to other drivetrain configurations, including two-wheel drive ("2WD") configurations, such as a rear-wheel drive ("RWD") configuration, wherein the rear driveline is an EDM constructed in accordance with the present teachings, or a front-wheel drive ("FWD") configuration, wherein the front driveline is an EDM constructed in accordance with the present teachings.

The control module 30 can be electrically coupled to the primary driveline 22 and the secondary driveline 26 to receive input signals from the primary driveline 22 and the secondary driveline 26. The control module 30 can be configured to output control signals to the primary driveline 22 and the secondary driveline 26 to control operation of the primary driveline 22 and the secondary driveline 26. While schematically shown separate from the EDM 58, the control module 30 can be disposed within the EDM 58 or coupled to the EDM 58.

Figure 2:
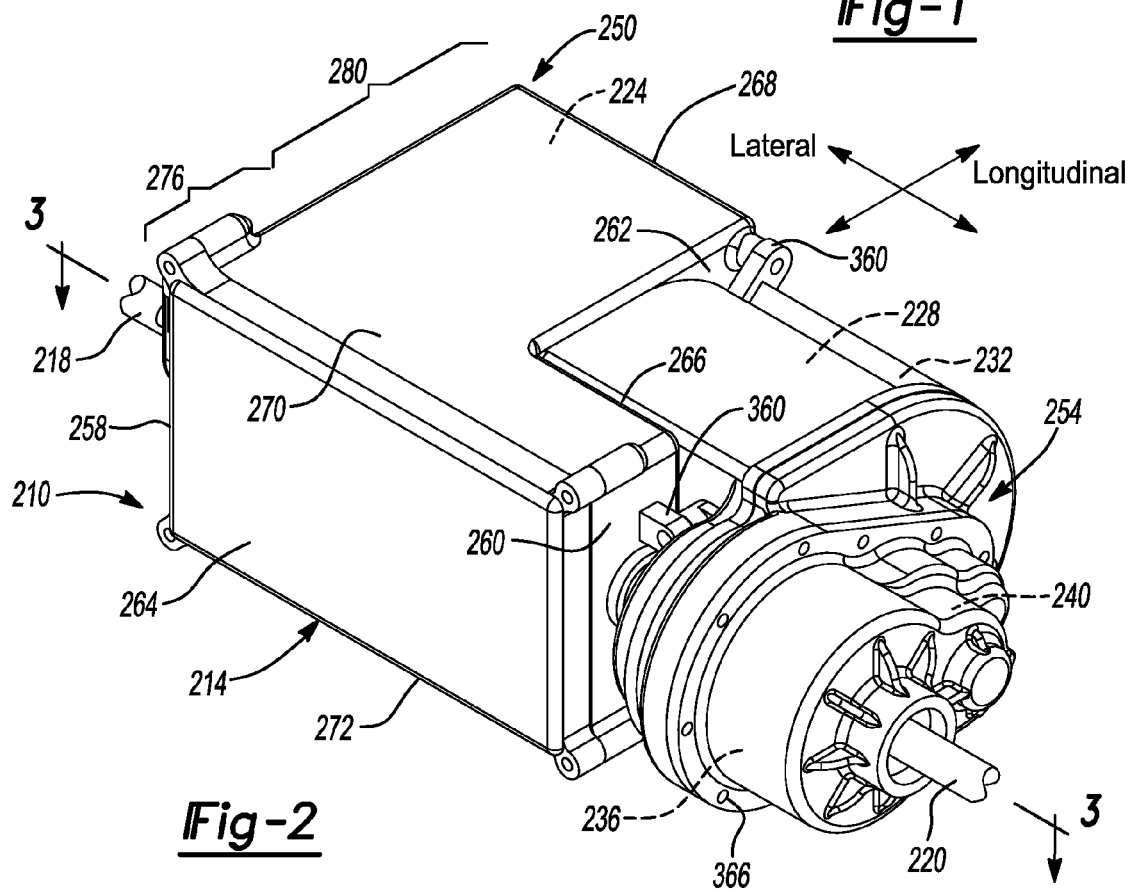
FIG. 2 is a perspective view of an EDM constructed in accordance with the present teachings.
Figure 3:
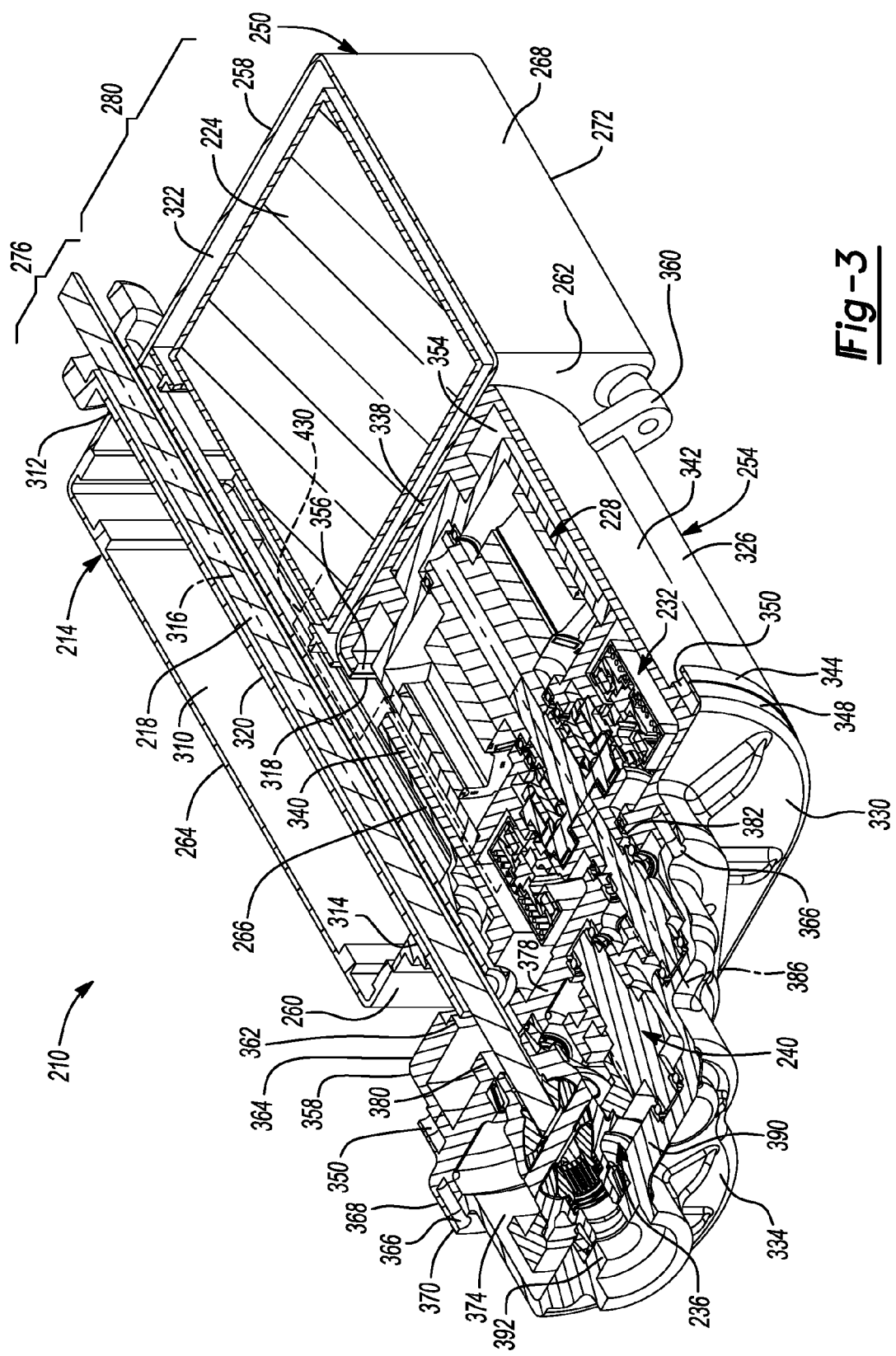
FIG. 3 is a perspective sectional view of the EDM of FIG. 2.

With reference to FIGS. 2 and 3, an example of the EDM 58 that was schematically shown in FIG. 1 is illustrated in greater detail and indicated by reference numeral 210. The EDM 210 can include an EDM housing 214, a first output shaft 218, a second output shaft 220, an electrical power source 224, a motor 228, a shift unit 232, and a differential 236. In the example provided, the EDM 210 also includes a reduction gearset 240.

EDM Housing

With continued reference to FIGS. 2 and 3, the EDM housing 214 can include a first case 250 and a second case 254. The first case 250 can have a first side wall 258, a second side wall 260, a third side wall 262, a fourth side wall 264, a fifth side wall 266, sixth side wall 268, a top wall 270 and a bottom wall 272. In the example provided, the top wall 270 extends between the side walls 258, 260, 262, 264, 266, 268 to form a top of the first case 250 that is generally perpendicular to the side walls 258, 260, 262, 264, 266, 268. In the example provided, the bottom wall 272 extends between the side walls 258, 260, 262, 264, 266, 268 and is generally parallel to the top wall 270 to form a bottom of the first case 250. The first case 250 can include a first portion 276 and a second portion 280. The first portion 276 can extend from the first side wall 258 in a lateral direction relative to the vehicle 10 (FIG. 1) to the second side wall 260 of the first case 250 and from the fourth side wall 264 in a longitudinal direction relative to the vehicle 10 (FIG. 1) to the fifth side wall 266. The first side wall 258 and the second side wall 260 can be connected in the lateral direction by the fourth side wall 264. The fourth side wall 264 and the fifth side wall 266 can be connected in the longitudinal direction by the second side wall 260.

The second portion 280 can extend from the first side wall 258 of the first case 250 in the lateral direction to the third side wall 262 of the first case 250. The distance from the first side wall 258 to the third side wall 262 can be less than the distance from the first side wall 258 to the second side wall 260. The second side wall 260 and the third side wall 262 can be connected in the lateral direction by the fifth side wall 266. The first side wall 258 and the second side wall 260 can be connected in the lateral direction by the sixth side wall 268. In the example provided, the first side wall 258, the second side wall 260, and the third side wall 262 are generally parallel to each other and generally perpendicular to the fourth side wall 264, the fifth side wall 266, and the sixth side wall 268, such that the first case 250 can generally have an "L" shaped cross-section.

The first portion 276 can define a first cavity 310, a first shaft aperture 312, and a second shaft aperture 314. The first cavity 310 can extend laterally between the first and second side walls 258, 260 and longitudinally between the fourth and fifth side walls 264, 266. The first shaft aperture 312 can extend through the first side wall 258 and be open to the first cavity 310. The second shaft aperture 314 can extend through the second side wall 260 and be open to the first cavity 310. The first output shaft 218 can extend along a first axis 316 through the first shaft aperture 312, the first cavity 310, and the second shaft aperture 314. In the example provided, an aperture 318 can also extend through the fifth side wall 266 to provide communication between the first cavity 310 and the second case 254 through the fifth side wall 266, as described below.

One end of the first output shaft 218 can be drivingly coupled to a corresponding one of the axle shafts 50, 54 to drive either the left or the right wheels of the second set of drive wheels 18 (FIG. 1). The other end of the first output shaft 218 can be drivingly coupled to the differential 236 as described in greater detail below. In the example provided, a tube 320 can also extend through the first shaft aperture 312, the first cavity 310, and the second shaft aperture 314. The tube 320 can be disposed about the first output shaft 218 and can isolate the first output shaft 218 from the first cavity 310. The first output shaft 218 can be supported within the tube 320 by one or more bearings (not shown) to permit rotation of the first output shaft 218 relative to the tube 320 and the first case 250. While not specifically shown, one or more seals can form a seal between the tube 320 and the second output shaft 220.

The second portion 280 can define a second cavity 322. The electrical power source 224 can be disposed within the second cavity 322 and can be fully encased within the first case 250. The electrical power source 224 can be any suitable device for storing and releasing electrical power required to operate the electric motor 228, such as a battery pack, capacitor or super capacitor pack for example. In the example provided, the first cavity 310 is open to the second cavity 322 within the first case 250.

The second case 254 can include a main body 326, an intermediate body 330, and an end cap 334. The second case 254 can be mounted to the first case 250 and can have a generally "L" shaped configuration that is opposite the "L" shape of the first case 250 to fit in the "L" shape of the first case 250. The main body 326 can have a seventh side wall 338 that can abut the third side wall 262 of the first case 250 and an eighth side wall 340 that can abut the fifth side wall 266 of the first case 250. The main body 326 can have a third portion 342 that extends in the lateral direction from the seventh side wall 338 of the main body 326 to a flange 344 of the main body 326 that is laterally beyond the second side wall 260 of the first case 250, such that the third portion 342 of the main body 326 is at least partially nestled in the open area of the "L" shape of the first case 250.

The intermediate body 330 can have a mating flange 348 that can be fixedly mounted to the flange 344 of the main body 326. In the example provided, the intermediate body is mounted to the main body 326 by a plurality of fasteners (not shown, e.g., bolts or screws). The fasteners (not shown) can be received in bores 350 disposed about the perimeters of the flanges 344, 348 to form a sealing connection therebetween.

The intermediate body 330 and the third portion 342 of the main body 326 can define a third cavity 354 that can be open at the ninth side wall 364 of the main body 326 when the intermediate body is not attached to the main body 326. The motor 228 and the shift unit 232 can be located within the third cavity 354, as discussed in greater detail below. In the example provided, the eighth side wall 340 of the main body 326 can have an aperture 356 that can be open to the aperture 318 of the fifth side wall 266 of the first case 250.

The main body 326 can have a fourth portion 358 that extends in the longitudinal direction from the third portion 342 of the main body 326 to overlap the second side wall 260 of the first case 250. Thus, the main body 326 has a generally "L" shape that is complementary to the "L" shape of the first case 250. A set of mounts 360 can fixedly couple the main body 326 to the first case 250. In the example provided, two of the mounts 360 connect the third portion 342 of the main body 326 to the third side wall 262 of the first case 250, while a third mount 360 connects the fourth portion 358 of the main body 326 to the second side wall 260 of the first case 250. Different numbers of mounts and/or different locations of mounts for connecting the second case 254 to the first case 250 can be used.

The fourth portion 358 of the main body 326 can include a third shaft aperture 362 that extends through a ninth side wall 364 of the main body 326 that opposes the second side wall 260 of the first case 250. In the example provided, the intermediate body 330 and the fourth portion 358 of the main body 326 also define a portion of the third cavity 354. The first output shaft 218 can extend along the first axis 316 through the third shaft aperture 362 and into to the third cavity 354. In the example provided, the tube 320 also extends along the first axis 316 into the third shaft aperture 362 to prevent debris from entering the first or third cavities 310, 354 through the second or third shaft apertures 314, 362.

The end cap 334 can be fixedly mounted to the intermediate body 330 by a plurality of fasteners (not shown, e.g., bolts or screws). The fasteners (not shown) can be received in bores 366 formed in flanges 368, 370 disposed about the perimeters of the intermediate body 330 and the end cap 334 to form a sealing connection therebetween. The end cap 334 and the intermediate body 330 can define a fourth cavity 374. The differential 236 and the reduction gearset 240 can be disposed within the fourth cavity 374, as discussed in greater detail below. The intermediate body 330 can have an intermediate wall 378 that separates the third cavity 354 from the fourth cavity 374. The intermediate wall 378 can define a fourth shaft aperture 380, through which the first output shaft 218 can extend into the fourth cavity 374. The intermediate wall 378 can also define a fifth shaft aperture 382, which can be aligned with a second axis 386 that is parallel to and offset from the first axis 316.

The end cap 334 can have an end wall 390 that encloses the fourth cavity 374. The end wall 390 can define a sixth shaft aperture 392. One end of the second output shaft 220 can be drivingly coupled to a corresponding one of the axle shafts 50, 54 to drive the corresponding left or right wheels of the second set of drive wheels 18 (FIG. 1). The second output shaft 220 can extend through the sixth shaft aperture 392 into the fourth cavity 374 and the other end of the second output shaft 220 can be drivingly coupled to the differential 236 as described in greater detail below. While not specifically shown, the second output shaft 220 can be supported by one or more bearings (not shown) for rotation relative to the end cap 334 and a seal (not shown) can form a seal between the end cap 334 and the second output shaft 220.

Motor

Figure 4:
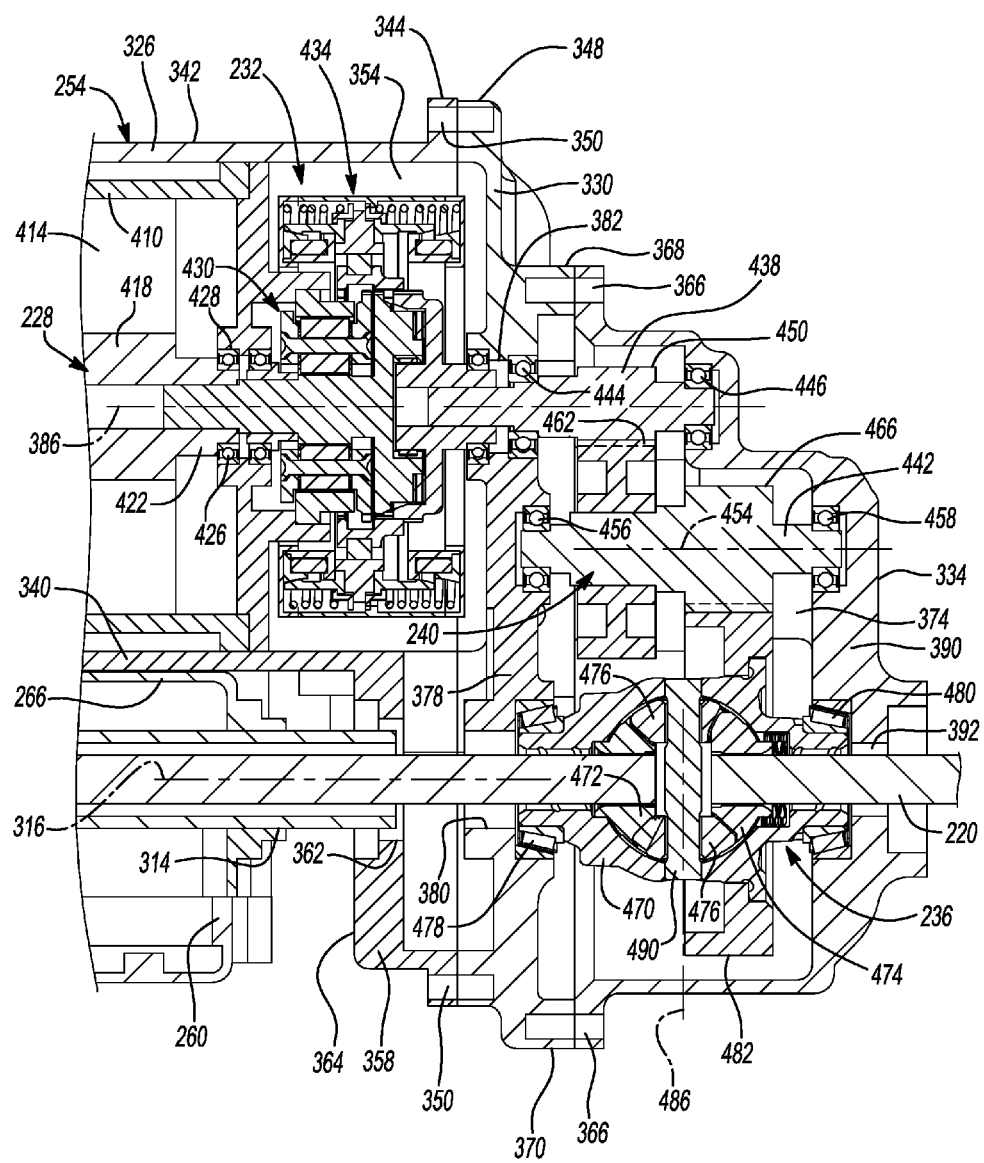
FIG. 4 is a sectional view of a portion of the EDM of FIG. 2, illustrating a shift unit of the EDM.

With additional reference to FIG. 4, the motor 228 can include a motor housing 410, a stator 414, a rotor 418, and a motor output member 422. The motor housing 410 can be disposed within the third cavity 354 and can be non-rotatably coupled to the main body 326. The stator 414 and rotor 418 can be within the motor housing 410 and disposed about the second axis 386. The stator 414 can be fixedly coupled to the motor housing 410 and disposed about the rotor 418. The rotor 418 can be supported for rotation relative to the motor housing 410 such as by bearings 426 disposed between the motor housing 410 and the rotor 418. The motor output member 422 can be non-rotatably coupled to the rotor 418 and can extend through an aperture 428 in the motor housing 410, where the motor output member 422 can be drivingly coupled to the shift unit 232 as described in greater detail below. A power cable (schematically shown as dashed line 430 in FIG. 3) can extend through the apertures 318, 356 (FIG. 3) to electrically connect the electrical power source 224 (FIG. 3) to the motor 228. The control module 30 (FIG. 1) can be configured to control the supply of electrical power to the motor 228 to control operation of the motor 228. The motor 228 can also be configured to charge the electrical power source 224 when the rotor 418 is driven by rotation of the second set of drive wheels 18.

Mode Shift Gearset

The shift unit 232 can include a mode shift gearset 432 and an actuator 434 configured to selectively shift the mode shift gearset 432 between a high speed mode, a low speed mode, and a neutral mode as discussed in greater detail below. The power cable (schematically shown as dashed line 430 in FIG. 3) can also electrically connect the electrical power source 224 (FIG. 3) to the actuator 434. The control module 30 (FIG. 1) can also be configured to control the supply of electrical power to the actuator 434 to control operation of the actuator 434. With additional reference to FIG. 5, the mode shift gearset 432 can include an input member 510, a planetary reduction gearset 514, an output member 518, and a shift member 522. The input member 510 can be non-rotatably coupled to the motor output member 422 and supported for rotation relative to the motor housing 410 by bearings 526. The input member 510 can include a first set of external teeth 530 and a second set of external teeth 534. In the example provided, the first set of external teeth are radially inward of the second set of external teeth 534 and the first set of external teeth are axially between the motor 228 and the second set of external teeth 534.

The planetary reduction gearset 514 can include the first set of external teeth 530, a plurality of planet gears 538, a planet carrier 542, and a ring gear 546. The first set of external teeth 530 can form the sun gear of the planetary reduction gearset 514. The teeth of the planet gears 538 can be meshingly engaged with the first set of external teeth 530 and the planet gears 538 can be spaced apart from each other circumferentially about the second axis 386 (FIG. 4). The planet gears 538 can be supported by the planet carrier 542 for rotation relative to the planet carrier 542 and for rotation about the second axis 386 with the planet carrier 542. The ring gear 546 can be disposed about the second axis 386 radially outward of the planet gears 538 and the teeth of the ring gear 546 can be meshingly engaged with the teeth of the planet gears 538. The ring gear 546 can be non-rotatably coupled to the motor housing 410. The planet carrier 542 can include a third set of external teeth 550. In the example provided, the third set of external teeth 550 are disposed axially between the second set of external teeth 534 and the motor housing 410.

The output member 518 can be disposed coaxially about the second axis 386 (FIG. 4) and can be supported for rotation by bearings 554 disposed between the output member 518 and the intermediate wall 378. The output member 518 can be supported for rotation relative to the input member 510 by bearings 558 which can be between the input member 510 and the output member 518. The output member 518 can include a fourth set of external teeth 562. The fourth set of external teeth 562 can be axially between the second set of external teeth 534 and the intermediate wall 378. In the example provided, the second, third, and fourth sets of external teeth 534, 550, 562 are aligned in the radially outward direction relative to the second axis 386 (FIG. 4).

The shift member 522 can have an annular shift collar body 566. An interior side of the shift collar body 566 can include a first set of internal teeth 570 and a second set of internal teeth 574. The first set of internal teeth 570 can be axially spaced apart from the second set of internal teeth 574. The first set of internal teeth 570 can be configured to meshingly engage with the second set of external teeth 534. The second set of internal teeth 574 can be configured to meshingly engage with the third set of external teeth 550 and the fourth set of external teeth 562. An exterior side of the shift collar body 566 can include a groove 578 that extends about the outer circumference of the shift collar body 566. The shift collar body 566 can be disposed coaxially about the second axis 386 (FIG. 4). The shift collar body 566 can be rotatable about the second axis 386 (FIG. 4) and the actuator 434 can be configured to axially translate the shift collar body 566, as discussed in greater detail below.

Figure 5:
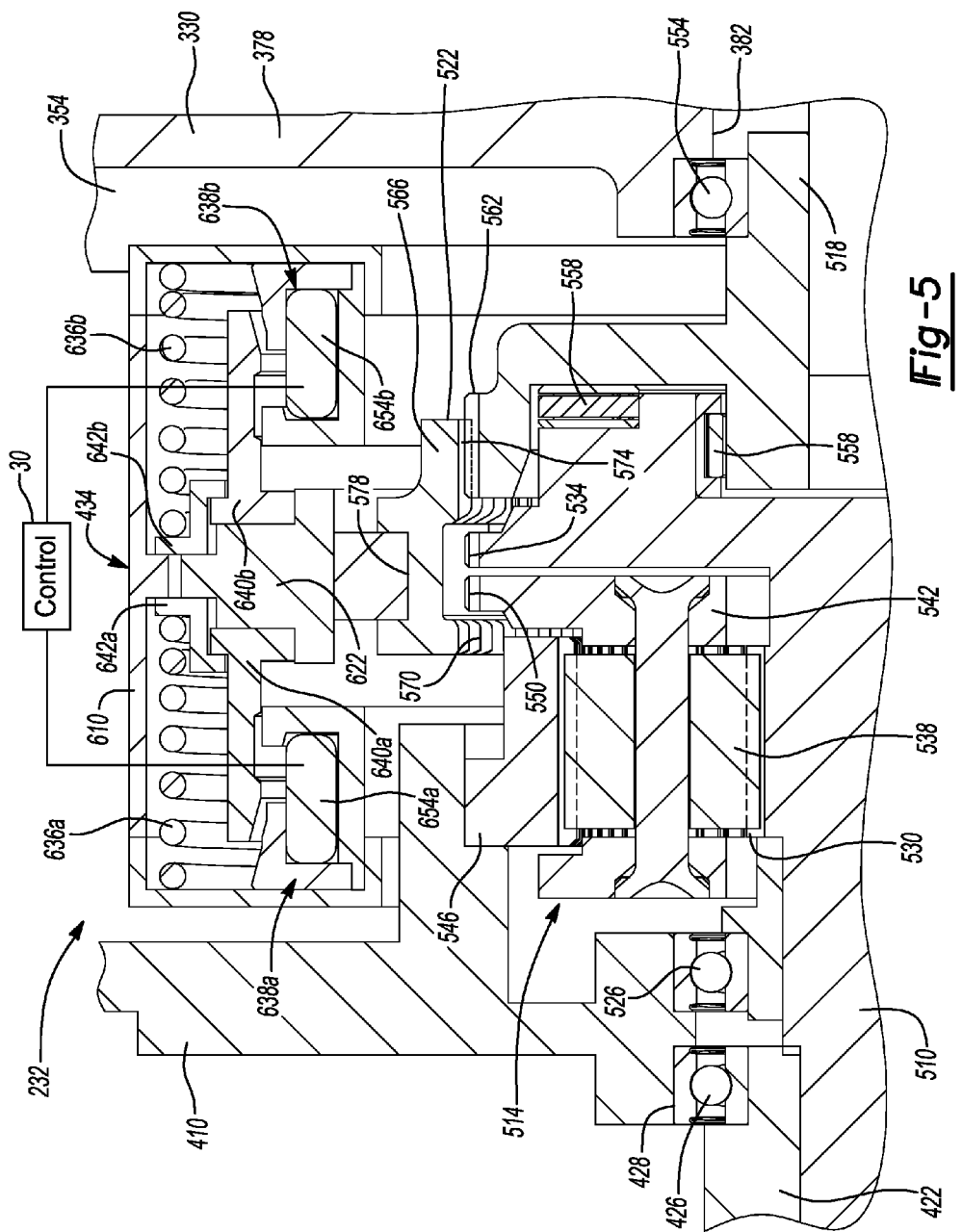
FIG. 5 is a sectional view of a portion of the shift unit of FIG. 4, illustrating a shift member of the shift unit in a first position.
Figure 7:
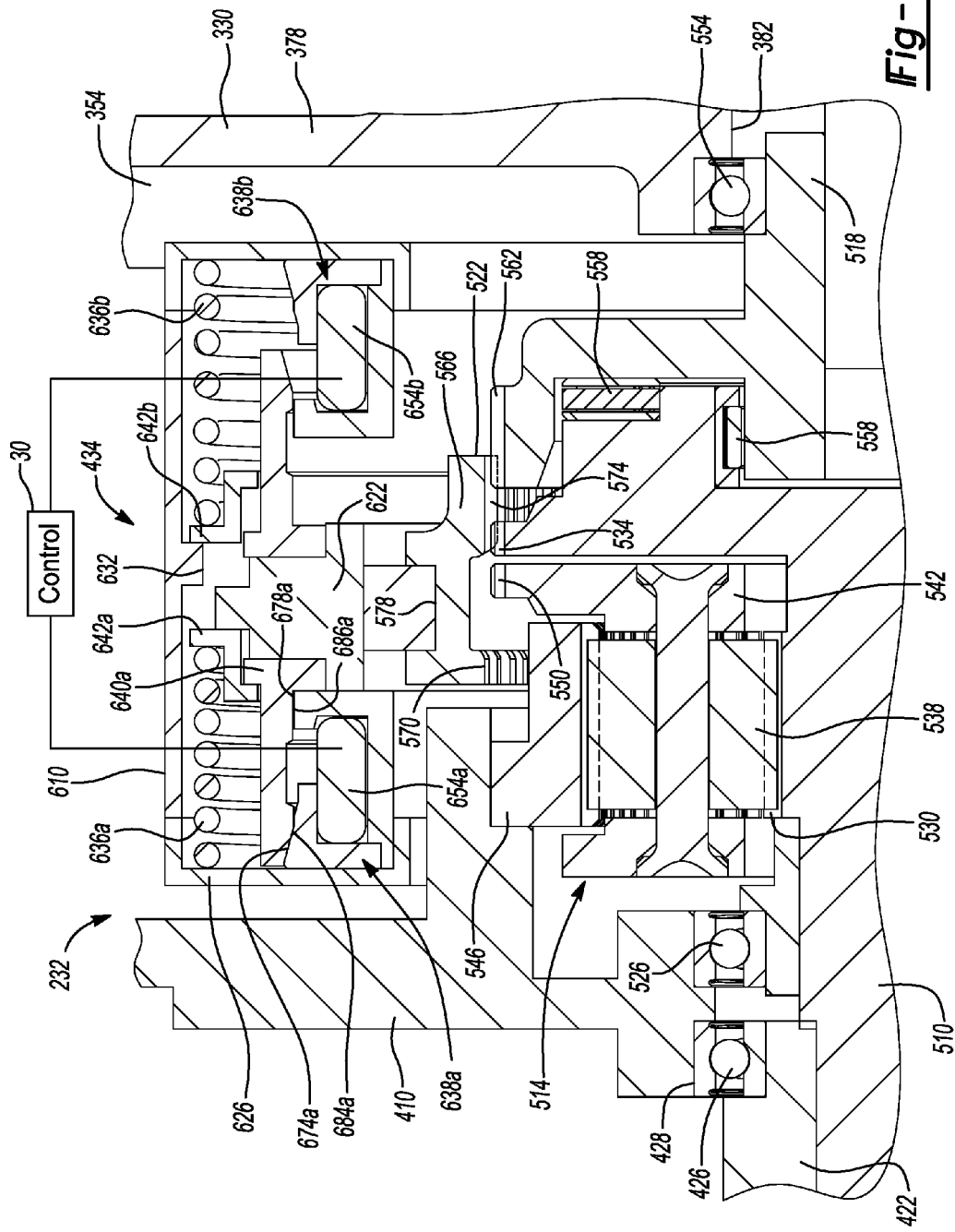
FIG. 7 is a sectional view similar to FIG. 5, illustrating the shift member in a second position.

The shift collar body 566 can be axially translatable between a first position (e.g., a neutral position, as shown in FIG. 5), a second position (e.g., a high speed position, as shown in FIG. 7), and a third position (e.g., a low speed position, as shown in FIG. 8). When the shift collar body 566 is in the first position (FIG. 5), the first set of internal teeth 570 can be disengaged from the second set of external teeth 534. When the shift collar body 566 is in the first position (FIG. 5), the second set of internal teeth 574 can be meshingly engaged with the fourth set of external teeth 562 and disengaged from the third set of external teeth 550, such that torque is not transmitted between the input member 510 and the output member 518.

When the shift collar body 566 is in the second position (FIG. 7), the first set of internal teeth 570 can be disengaged from the second set of external teeth 534. When the collar body 566 is in the second position (FIG. 7), the second set of internal teeth 574 can be meshingly engaged with the third set of external teeth 550 and the fourth set of external teeth 562, such that torque is transmitted between the input member 510 and the output member 518 through only the shift member 522 and not the planetary reduction gearset 514.

When the shift collar body 566 is in the third position (FIG. 8), the first set of internal teeth 570 can be engaged with the second set of external teeth 534. When the shift collar body 566 is in the third position (FIG. 8), the second set of internal teeth 574 can be meshingly engaged with the fourth set of external teeth 562 and disengaged from the third set of external teeth 550, such that torque is transmitted between the input member 510 and the output member 518 through the planetary reduction gearset 514 and the shift member 522.

Reduction Gearset and Differential

Returning to FIG. 4, the reduction gearset 240 can include a reduction input member 438 and an intermediate member 442. The reduction input member 438 can be coaxially disposed about the second axis 386 and rotatably supported by bearings 444 and 446. The bearings 444 can be mounted between the intermediate wall 378 and the reduction input member 438. The bearings 446 can be mounted between the end cap 334 and the reduction input member 438. The reduction input member 438 can extend through the fifth shaft aperture 382 and be non-rotatably coupled to the output member 518 of the mode shift gearset 432. The reduction input member 438 can include a fifth set of external teeth 450 disposed within the fourth cavity 374.

The intermediate member 442 can be coaxially disposed about a third axis 454 that can be parallel to the second axis 386 and offset therefrom, between the first axis 316 and the second axis 386. The intermediate member 442 can be rotatably supported by bearings 456 and 458. The bearings 456 can be mounted between the intermediate wall 378 and the intermediate member 442. The bearings 458 can be mounted between the end cap 334 and the intermediate member 442. The intermediate member 442 can include a sixth set of external teeth 462 meshingly engaged with the fifth set of external teeth 450. The sixth set of external teeth 462 can have a greater diameter than the fifth set of external teeth 450. The intermediate member 442 can also include a seventh set of external teeth 466. The sixth set of external teeth 462 can have a greater diameter than the seventh set of external teeth 466.

The differential 236 can include a differential case 470, a first side gear 472, a second side gear 474, and a pair of pinion gears 476. The differential case 470 can be can be rotatably supported within the fourth cavity 374 by bearings 478 and 480 to rotate coaxially about the first axis 316. The bearings 478 can be mounted between the intermediate wall 378 and the differential case 470. The bearings 480 can be mounted between the end cap 334 and the differential case 470. The differential case 470 can include an eighth set of external teeth 482 that can be meshingly engaged with the seventh set of external teeth 466.

The pinion gears 476 can be mounted within the differential case 470 for common rotation about the first axis 316 and for rotation relative to the differential case 470 about a fourth axis 486. In the example provided, the pinion gears 476 are rotatably mounted about a center pin 490 that is coupled to the differential case 470 and disposed about the fourth axis 486. The first and second side gears 472, 474 can be mounted within the differential case 470 for rotation about the first axis 316 relative to the differential case 470. The first side gear 472 can be meshingly engaged with both pinion gears 476. The second side gear 474 can be meshingly engaged with both pinion gears 476. The first side gear 472 can be non-rotatably coupled to the first output shaft 218, such as by a splined connection for example. The second side gear 474 can be non-rotatably coupled to the second output shaft 220, such as by a splined connection for example. Thus, the differential 236 can receive input torque from the reduction gearset 240 and output differential torque to the first and second output shafts 218, 220.

Actuator

Figure 6:
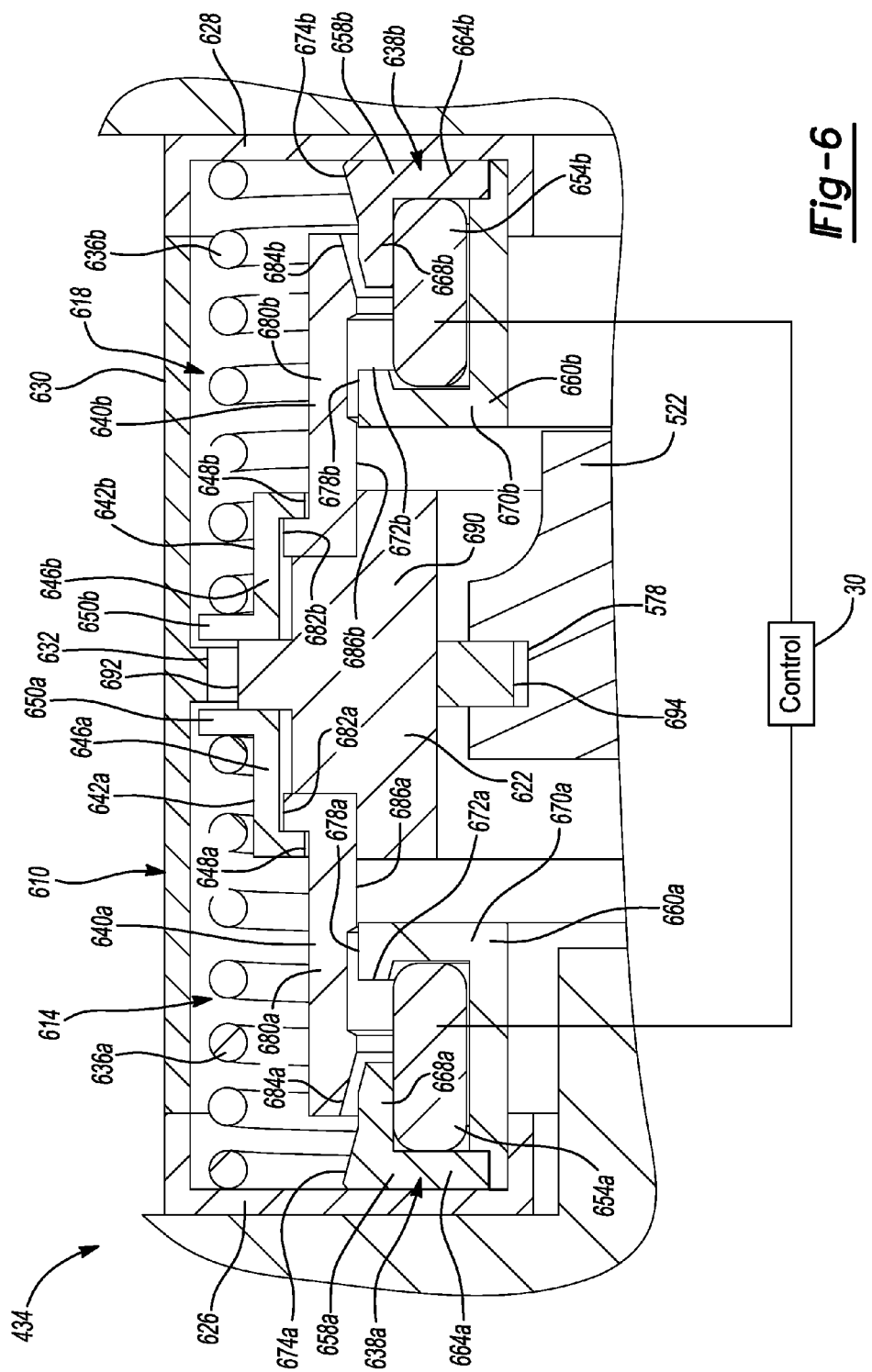
FIG. 6 is a sectional view of a portion of an actuator of the shift unit of FIG. 4.

With additional reference to FIG. 6, the actuator 434 can include an actuator housing 610, a first solenoid 614, a second solenoid 618, and an actuator output member 622 which are disposed coaxially about the second axis 386 (FIG. 4). The actuator housing 610 can be disposed within the third cavity 354 between the motor housing 410 and the intermediate wall 378. The actuator housing 610 can have a first end wall 626 proximate to the motor housing 410, a second end wall 628 proximate to the intermediate wall 378, a cylindrical outer wall 630 extending between the first and second end walls 626, 628, and a stop member 632 that extends radially inward from the cylindrical outer wall 630 at a location centered between the first and second end walls 626, 628.

The first solenoid 614 can include a spring 636a, an electromagnet 638a, an armature 640a, and a spring perch 642a that are within the actuator housing 610. The spring perch 642a can have a generally cylindrical perch body 646a disposed coaxially about the second axis 386 (FIG. 4), a perch catch lip 648a that extends radially inward from one end of the perch body 646a, and a spring lip 650a that extends radially outward from an opposite end of the perch body 646a. The spring 636a can be a compression coil spring disposed coaxially about the second axis 386 (FIG. 4). One end of the spring 636a can abut the first end wall 626 of the actuator housing 610. The opposite end of the spring 636a can be disposed about the perch body 646a and can engage the spring lip 650a of the spring perch 642a to bias the spring perch 642a toward the stop member 632 of the actuator housing 610.

The electromagnet 638a can include a solenoid coil 654a, a first pole piece 658a, and a second pole piece 660a that are disposed coaxially about the second axis 386 (FIG. 4). The solenoid coil 654a can be configured to generate a magnetic field (not shown) when electrical current flows through the solenoid coil 654a. The first and second pole pieces 658a, 660a can be formed of ferromagnetic materials (e.g., steel).

The first pole piece 658a can have an end portion 664a that is axially between the solenoid coil 654a and the first end wall 626 of the actuator housing 610 and extends radially outward of the solenoid coil 654a. The first pole piece 658a can have an outer portion 668a that is radially outward of the solenoid coil 654a and extends axially from the end portion 664a of the first pole piece 658a toward the second end wall 628 of the actuator housing 610.

The second pole piece 660a can have an end portion 670a that is axially between the solenoid coil 654a and the stop member 632 and extends radially outward of the solenoid coil 654a. The second pole piece 660a can have an outer portion 672a that is radially outward of the solenoid coil 654a and extends axially from the end portion 670a of the second pole piece 660a toward the first end wall 626 of the actuator housing 610.

The outer portions 668a, 672a of the first and second pole pieces 658a, 660a can terminate axially such that a gap is formed axially between the outer portions 668a, 672a on the radially outward side of the solenoid coil 654a. In the example provided, the outer portion 668a of the first pole piece 658a has an angled or tapered outer circumferential face 674a that tapers to widen toward the first end wall 626 of the actuator housing 610, though other configurations can be used. In the example provided, the outer portion 672a of the second pole piece 660a has a generally cylindrical outer circumferential face 678a. In the example provided, the second pole piece 660a also extends axially along a radially inner side of the solenoid coil 654a to connect with the end portion 664a of the first pole piece 658a.

The armature 640a can have a generally cylindrical armature body 680a, and an armature catch lip 682a. The armature body 680a can be radially outward of the electromagnet 638a. An end of the armature body 680a that is proximate to the first end wall 626 of the actuator housing 610 can have an inner circumferential face 684a that is angled or tapered to mate with the outer circumferential face 674a of the first pole piece 658a. An end of the armature body 680a that is distal to the first end wall 626 of the actuator housing 610 can have an inner circumferential face 686a that is cylindrically shaped to mate with the outer circumferential face 678a of the second pole piece 660a when the inner circumferential face 684a mates with the outer circumferential face 674a of the first pole piece 658a.

The armature catch lip 682a can extend radially outward from the end of the armature body 680a that is distal to the first end wall 626 of the actuator housing 610. The armature catch lip 682a can overlap radially with the perch catch lip 648a and can be axially between the perch catch lip 648a and the second end wall 628 of the actuator housing 610.

The second solenoid 618b can be similar to the first solenoid 614a, but be mirrored about the stop member 632 of the actuator housing 610. In other words, the second solenoid 618b can include a spring 636b, an electromagnet 638b, an armature 640b, and a spring perch 642b that are within the actuator housing 610. The spring perch 642b can have a generally cylindrical perch body 646b disposed coaxially about the second axis 386 (FIG. 4), a perch catch lip 648b that extends radially inward from one end of the perch body 646b, and a spring lip 650b that extends radially outward from an opposite end of the perch body 646b. The spring 636b can be a compression coil spring disposed coaxially about the second axis 386 (FIG. 4). One end of the spring 636b can abut the second end wall 628 of the actuator housing 610. The opposite end of the spring 636b can be disposed about the perch body 646b and can engage the spring lip 650b of the spring perch 642b to bias the spring perch 642b toward the stop member 632 of the actuator housing 610.

The electromagnet 638b can include a solenoid coil 654b, a first pole piece 658b, and a second pole piece 660b that are disposed coaxially about the second axis 386 (FIG. 4). The solenoid coil 654b can be configured to generate a magnetic field (not shown) when electrical current flows through the solenoid coil 654b. The first and second pole pieces 658b, 660b can be formed of ferromagnetic materials (e.g., steel).

The first pole piece 658b can have an end portion 664b that is axially between the solenoid coil 654b and the second end wall 628 of the actuator housing 610 and extends radially outward of the solenoid coil 654b. The first pole piece 658b can have an outer portion 668b that is radially outward of the solenoid coil 654b and extends axially from the end portion of the first pole piece 658b toward the first end wall 626 of the actuator housing 610.

The second pole piece 660b can have an end portion 670b that is axially between the solenoid coil 654b and the stop member 632 and extends radially outward of the solenoid coil 654b. The second pole piece 660b can have an outer portion 672b that is radially outward of the solenoid coil 654b and extends axially from the end portion 670b of the second pole piece 660b toward the second end wall 628 of the actuator housing 610.

The outer portions 668b, 672b of the first and second pole pieces 658b, 660b can terminate axially such that a gap is formed axially between the outer portions 668b, 672b on a radially outward side of the solenoid coil 654b. In the example provided, the outer portion 668b of the first pole piece 658b has an angled or tapered outer circumferential face 674b that tapers to widen toward the second end wall 628 of the actuator housing 610, though other configurations can be used. In the example provided, the outer portion 672b of the second pole piece 660b has a generally cylindrical outer circumferential face 678b. In the example provided, the second pole piece 660b also extends axially along a radially inner side of the solenoid coil 654b to connect with the end portion 664b of the first pole piece 658b.

The armature 640b can have a generally cylindrical armature body 680b, and an armature catch lip 682b. The armature body 680b can be radially outward of the electromagnet 638b. An end of the armature body 680b that is proximate to the second end wall 628 of the actuator housing 610 can have an inner circumferential face 684b that is angled or tapered to mate with the outer circumferential face 674b of the first pole piece 658b. An end of the armature body 680b that is distal to the second end wall 628 of the actuator housing 610 can have an inner circumferential face 686b that is cylindrically shaped to mate with the outer circumferential face 678b of the second pole piece 660b when the inner circumferential face 684b mates with the outer circumferential face 674b of the first pole piece 658b.

The armature catch lip 682b can extend radially outward from the end of the armature body 680b that is distal to the second end wall 628 of the actuator housing 610. The armature catch lip 682b can overlap radially with the perch catch lip 648b and can be axially between the perch catch lip 648b and the first end wall 626 of the actuator housing 610.

The actuator output member 622 can include an annular actuator collar body 690 disposed coaxially about the second axis 386 (FIG. 4) and about the shift collar body 566. The actuator collar body 690 can be fixedly coupled to the armature bodies 680a, 680b for common axial translation along the second axis 386 (FIG. 4). The actuator output member 622 can include an outer lip 692 that extends radially outward from the actuator collar body 690 to engage the spring perches 642a, 642b. In the example provided, the outer lip 692 is not fixedly attached to the spring perches 642a, 642b. The actuator output member 622 can include an inner lip 694 that extends radially inward from the actuator collar body 690 and can be rotatably received in the groove 578 of the shift collar body 566. The inner lip 694 can couple the actuator output member 622 for common axial movement, while permitting relative rotation therebetween.

Operation of Shift Unit

With reference to FIGS. 5-8, the actuator is operable in a first mode (FIG. 5), a second mode (FIG. 7), and a third mode (FIG. 8). The control module 30 (FIG. 1) can be configured to control the supply of electrical power to the actuator 434 to control operation of the actuator 434. The actuator 434 can be in the first mode (FIG. 5), e.g., a non-activated mode, when electrical current is supplied to neither of the solenoid coils 654a, 654b. When both solenoid coils 654a, 654b are deactivated, the springs 636a, 636b act on their respective spring perches 642a, 642b to position the actuator output member 622 centrally relative to the actuator housing 610 to position the shift member 522 in the first position (e.g., the neutral position).

The actuator 434 can be in the second mode (FIG. 7) when the solenoid coil 654a is activated and the solenoid coil 654b is deactivated. When the solenoid coil 654a is activated, the magnetic field (not shown) of the electromagnet 638a can attract the armature 640a to move axially in the direction toward the first end wall 626 of the actuator housing 610, while the spring perch 642b remains biased against the stop member 632. The magnetic field (not shown) can overcome the biasing force of the spring 636a to move the armature 640a and compress the spring 636a. The magnetic field (not shown) can attract the inner circumferential face 684a to the outer circumferential face 674a and the inner circumferential face 686a to the outer circumferential face 678a to move the shift member 522 to the second position (e.g., the high speed mode). With the actuator 434 in the second mode (FIG. 7), the solenoid coil 654a can then be deactivated to allow the spring 636a to move the actuator output member 622 back toward the center of the actuator housing 610 to return the shift member 522 to the first position (e.g., the neutral position).

The actuator 434 can be in the third mode (FIG. 8) when the solenoid coil 654b is activated and the solenoid coil 654a is deactivated. When the solenoid coil 654b is activated, the magnetic field (not shown) of the electromagnet 638b can attract the armature 640b to move axially in the direction toward the second end wall 628 of the actuator housing 610, while the spring perch 642a remains biased against the stop member 632. The magnetic field (not shown) can overcome the biasing force of the spring 636b to move the armature 640b and compress the spring 636b. The magnetic field (not shown) can attract the inner circumferential face 684b to the outer circumferential face 674b and the inner circumferential face 686b to the outer circumferential face 678b to move the shift member 522 to the third position (e.g., the low speed mode). With the actuator 434 in the third mode (FIG. 8), the solenoid coil 654b can be deactivated to allow the spring 636b to move the actuator output member 622 back toward the center of the actuator housing 610 to return the shift member 522 to the first position (e.g., the neutral position).

Example of One Alternate Shift Unit Configuration

With additional reference to FIG. 9, a portion of an alternate configuration of a shift unit 232' is illustrated. The shift unit 232' is similar to the shift unit 232, except as otherwise illustrated or described herein. Elements with primed reference numerals are similar to elements having similarly, non-primed reference numerals described above, except as otherwise illustrated or described herein. The shift member 522' of the shift unit 232' can be similar to the shift member 522, except that the first set of internal teeth 570' can be configured to meshingly engage the second set of external teeth 534' and the third set of external teeth 550', and that the second set of internal teeth 574' can be configured to meshingly engage the fourth set of external teeth 562', but not the third set of external teeth 550'.

The first and second internal sets of teeth 570', 574' can be axially spaced apart such that when the shift member 522' is in the first position (shown in FIG. 9), the first set of internal teeth 570' can be engaged with the third set of external teeth 550' and disengaged from the second set of external teeth 534'. When the shift member 522' is in the first position (FIG. 9), the second set of internal teeth 574' can be disengaged from the third and fourth sets of external teeth 550', 562'. Thus, when the shift member 522' is in the first position, torque is not transmitted from the input member 510' to the output member 518' and the shift unit 232' is in a neutral mode.

When the shift member 522' is in the second position (i.e., moved toward the first end wall 626' of the actuator housing 610', similar to the second position described above except as otherwise shown and described herein), the first set of internal teeth 570' are engaged with the second set of external teeth 534' and are disengaged from the third set of external teeth 550'. When the shift member 522' is in the second position, the second set of internal teeth 574' are engaged with the fourth set of external teeth 562'. Thus, torque can be transmitted between the input member 510' and the output member 518' through the planetary reduction gearset 514' and the shift member 522' and the shift unit 232' is in a low speed mode.

When the shift member 522' is in the third position (i.e., moved toward the second end wall 628' of the actuator housing 610'), the first set of internal teeth 570' are engaged with the third set of external teeth 550' and the fourth set of external teeth 562'. When the shift member 522' is in the third position, the second set of internal teeth 574' are disengaged from the fourth set of external teeth 562'. Thus, torque can be transmitted between the input member 510' and the output member 518' through only the shift member 522' and not through the planetary reduction gearset 514' and the shift unit 232' is in a high speed mode.

The actuator 434' can be similar to the actuator 434 (FIGS. 4-8) and can be similarly actuated to move the shift member 522' between the first, second, and third positions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An axle assembly for a vehicle, the axle assembly comprising:
    a first output shaft;
    a second output shaft;
    a housing;
    an electric motor disposed within the housing and including a first output member;
    an electric power source disposed within the housing and electrically coupled to the electric motor to provide electrical power thereto;
    a mode shift gearset disposed within the housing and including a second output member and a shift member, the shift member being movable between a first position and a second position relative to the first and second output members, the shift member transmitting torque between the first and second output members when the shift member is in the second position;
    an actuator disposed within the housing and coupled to the shift member, the actuator being configured to move the shift member between the first and second positions; and
    a differential disposed within the housing and including a differential case and a differential gearset, the differential case being drivingly coupled to the second output member to receive rotary power therefrom, the differential gearset being configured to transmit rotary power between the differential case and the first and second output shafts.

2. The axle assembly of claim 1, wherein the housing defines a second cavity and a third cavity separated from the second cavity, wherein the electric power source is disposed within the second cavity, and wherein the electric motor, the mode shift gearset, and the actuator are disposed within the third cavity.

3. The axle assembly of claim 2, wherein the housing includes a first case and a second case that is fixedly mounted to the first case, wherein the first case defines the second cavity and the second case defines the third cavity.

4. The axle assembly of claim 3, wherein the second case defines a fourth cavity that is separated from the second and third cavities, and wherein the differential is disposed within the fourth cavity.

5. The axle assembly of claim 1, wherein the differential case is supported for rotation relative to the housing about a first axis, and the first and second output members are supported for rotation relative to the housing about a second axis that is parallel and offset from the first axis.

6. The axle assembly of claim 5, further comprising an intermediate member disposed within the housing and supported for rotation relative to the housing about a third axis that is parallel to and offset from the first axis, the intermediate member being drivingly coupled between the second output member and the differential case to transmit rotary power therebetween.

7. The axle assembly of claim 1, wherein the mode shift gearset includes a first input member non-rotatably coupled to the first output member, wherein the first input member includes a second set of teeth and the second output member includes a fourth set of teeth, wherein when the shift member is in the second position, the shift member engages the second and fourth sets of teeth to couple the first input member and the second output member for common rotation.

8. The axle assembly of claim 7, wherein when the shift member is in the first position, the shift member is disengaged from either the second set of teeth or the fourth set of teeth and torque is not transmitted between the first input member and the second output member.

9. The axle assembly of claim 7, wherein the mode shift gearset includes a third output member that is rotatable relative to the first input member and is coupled to the first input member to receive rotary power from the first input member, wherein the third output member includes a third set of teeth, and wherein when the shift member is in the first position, the shift member engages the third set of teeth and the fourth set of teeth to couple the third output member and the second output member for common rotation.

10. The axle assembly of claim 9, wherein the mode shift gearset includes a planetary reduction gearset including a sun gear, a plurality of planet gears, and a planet carrier, wherein the first input member is non-rotatably coupled to the sun gear and the third output member is non-rotatably coupled to the planet carrier.

11. The axle assembly of claim 10, wherein actuator is configured to move the shift member between the first position, the second position, and a third position, wherein when the shift member is in the third position, the shift member is disengaged from at least two of the second set of teeth, the third set of teeth, or the fourth set of teeth and torque is not transmitted between the first input member and the second output member.

12. An axle assembly for a vehicle, the axle assembly comprising:
a first output shaft rotatable about a first axis;
a second output shaft rotatable about the first axis;
a mode shift unit including:
a first input member rotatable about the second axis and including a first set of teeth and a second set of teeth;
a second input member rotatable about the second axis and including a third set of teeth;
a gearset coupling the first input member to the second input member such that rotation of the first input member drives rotation of the second input member at a rotational speed that is different from a rotational speed of the first input member;
an output member rotatable about the second axis and including a fourth set of teeth; and
a shift member rotatable about the second axis and axially movable along the second axis between a first axial position and a second axial position, the shift member being configured to matingly engage the second, third, and fourth sets of teeth, wherein when the shift member is in the first axial position, the shift member is disengaged from at least two of the second, third, and fourth sets of teeth, wherein when the shift member is in the second axial position, the shift member matingly engages the second and fourth sets of teeth to couple the first input member and the output member for common rotation, and wherein when the shift member is in the third axial position, the shift member matingly engages the third and fourth sets of teeth to couple the second input member and the output member for common rotation;
a linear motor coupled to the shift member and configured to move the shift member between the first, second and third axial positions; and
a differential including a differential case and a differential gearset, the differential case being drivingly coupled to the output member to receive rotary power therefrom, the differential gearset being configured to transmit rotary power between the differential case and the first and second output shafts.

13. The axle assembly of claim 12, wherein when the shift member is in the first position, the shift member is disengaged from the second and third sets of teeth and is engaged with the fourth set of teeth.

14. The axle assembly of claim 12, wherein when the shift member is in the first position, the shift member is disengaged from the third and fourth sets of teeth and is engaged with the second set of teeth.

15. The axle assembly of claim 12, wherein the second, third, and fourth sets of teeth are external teeth.

16. The axle assembly of claim 15, wherein the shift member includes a first set of internal teeth and a second set of internal teeth that are axially spaced apart from the first set of internal teeth, the first set of internal teeth being configured to engage the third set of external teeth, and the second set of internal teeth being configured to engage the fourth set of external teeth, wherein one of the first or second sets of internal teeth are also configured to engage the second set of external teeth.

17. The axle assembly of claim 12, wherein the gearset is a planetary gearset including a sun gear, a plurality of planet gears, and a planet carrier, wherein the first input member is non-rotatably coupled to the sun gear, and the second input member is non-rotatably coupled to the planet carrier.

18. An axle assembly for a vehicle, the axle assembly comprising:
a first output shaft rotatable about a first axis;
a second output shaft rotatable about the first axis;
an input member disposed about a second axis;
an output member disposed about the second axis;
a differential including a differential case and a differential gearset, the differential case being drivingly coupled to the output member to receive rotary power therefrom, the differential gearset being configured to transmit rotary power between the differential case and the first and second output shafts;
a shift unit operable in a first mode, a second mode, and a third mode, wherein when the shift unit is in the first mode, rotary power is not transferred between the input member and the output member, wherein when the shift unit is in the second mode, the input and output members are coupled to transmit rotary power between the input member and the output member at a first speed ratio, and wherein when the shift unit is in the third mode, the input and output members are coupled to transmit rotary power between the input member and the output member at a second speed ratio that is different from the first speed ratio; and
an actuator configured to switch the shift unit between the first, second and third modes, the actuator including:
an armature assembly disposed about the second axis and movable in a first axial direction from a first position to a second position, and in a second axial direction from the first position to a third position;
a first electromagnet and a second electromagnet disposed about the second axis, wherein the first electromagnet is configured to move the armature assembly from the first position to the second position when the first electromagnet is activated, wherein the second electromagnet is configured to move the armature assembly from the first position to the third position when the second electromagnet is activated; and
a first spring and a second spring disposed about the second axis, wherein when the armature assembly is between the first and second positions, the first spring biases the armature assembly in the second direction and the second spring does not bias the armature assembly in the first direction, and wherein when the armature assembly is between the first and third positions, the second spring biases the armature assembly in the first direction and the first spring does not bias the armature assembly in the second direction.

19. The axle assembly of claim 18, wherein the actuator includes a housing, a first perch, and a second perch, the housing having a first end wall, a second end wall, and a stop member disposed between the first and second end walls, wherein the first spring is disposed between the first end wall and the first perch, and the second spring is disposed between the second end wall and the second perch;
wherein when the armature assembly is in the first position, the first spring biases the first perch into contact with the stop member and the second spring biases the second perch into contact with the stop member;

wherein when the armature assembly is moved from the first position toward the second position, the stop member engages the second perch to prevent axial movement of the second perch in the first axial direction;

wherein when the armature assembly is moved from the first position toward the third position, the stop member engages the first perch to prevent axial movement of the first perch in the second axial direction and the second spring perch engages the armature assembly to bias the armature assembly in the first axial direction.

20. The axle assembly of claim 18, wherein the shift unit includes a shift member disposed about the second axis and coupled to the armature assembly for common axial movement, the shift member being rotatable about the second axis relative to the armature assembly, the shift member coupling the input member to the output member when the armature assembly is in the second and third positions.

\* \* \* \* \*